May 21, 1935.　　　F. A. MARTOCCIO　　　2,002,018
METHOD OF AND APPARATUS FOR APPLYING NUTS TO CANDY BARS
Filed Jan. 7, 1932　　　4 Sheets-Sheet 1
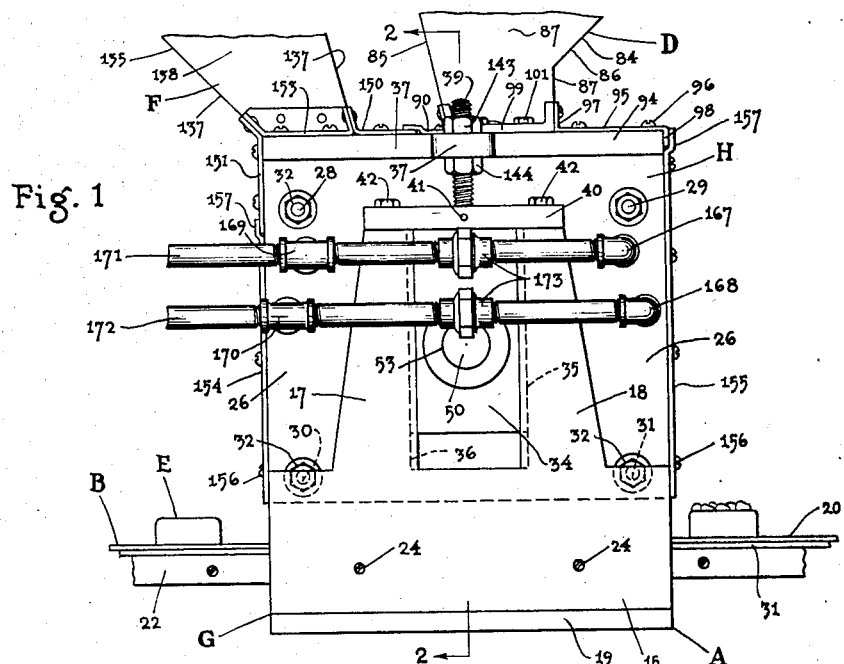
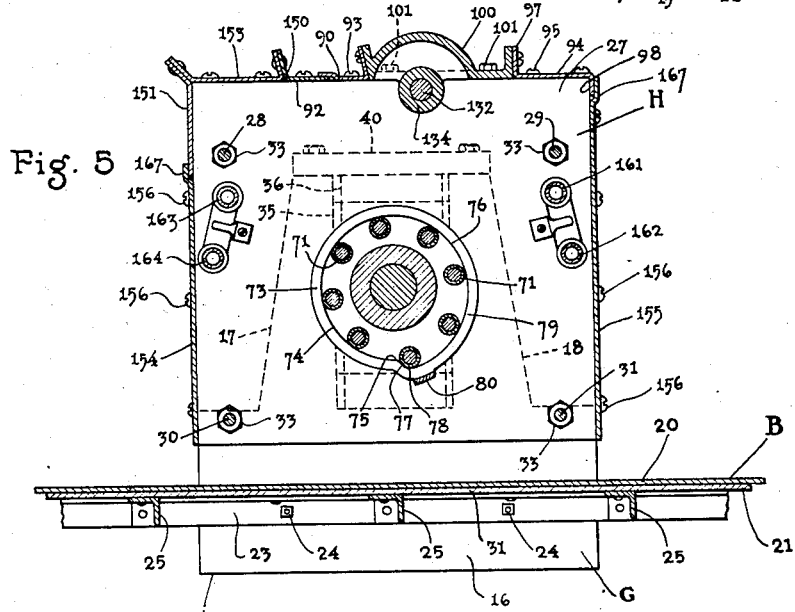
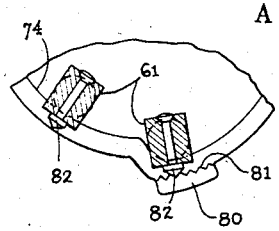
Inventor
Frank A. Martoccio
By Caswell & Lagaard
Attorneys May 21, 1935.    F. A. MARTOCCIO    2,002,018
METHOD OF AND APPARATUS FOR APPLYING NUTS TO CANDY BARS
Filed Jan. 7, 1932    4 Sheets-Sheet 2
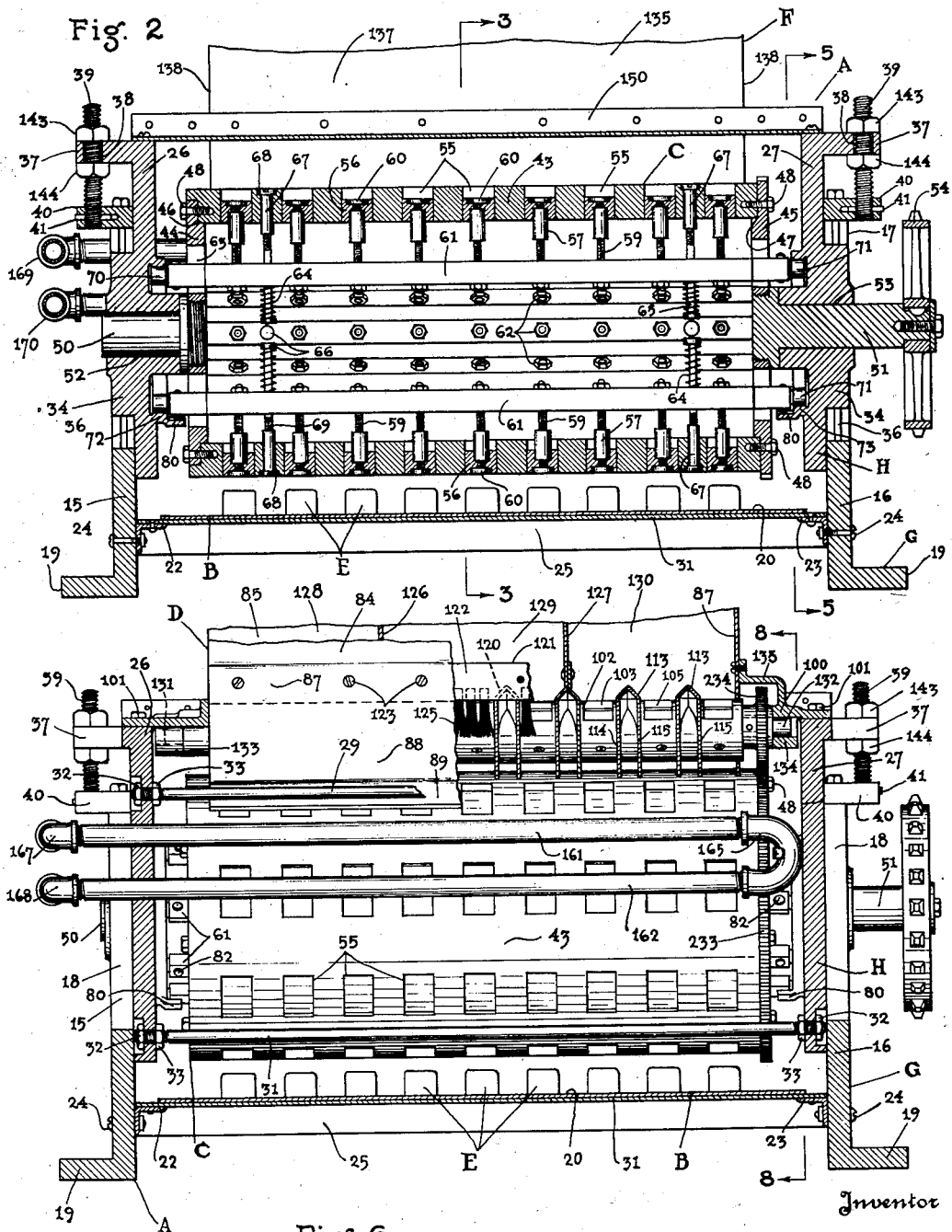

May 21, 1935. F. A. MARTOCCIO 2,002,018
METHOD OF AND APPARATUS FOR APPLYING NUTS TO CANDY BARS
Filed Jan. 7, 1932 4 Sheets-Sheet 3

Inventor
Frank A. Martoccio
By Caswell & Lagaard
Attorneys

May 21, 1935. F. A. MARTOCCIO 2,002,018
METHOD OF AND APPARATUS FOR APPLYING NUTS TO CANDY BARS
Filed Jan. 7, 1932 4 Sheets-Sheet 4

Inventor
Frank A. Martoccio
By Caswell & Lagaard
Attorneys

Patented May 21, 1935

2,002,018

UNITED STATES PATENT OFFICE 2,002,018

METHOD OF AND APPARATUS FOR APPLYING NUTS TO CANDY BARS

Frank A. Martoccio, Minneapolis, Minn.

Application January 7, 1932, Serial No. 585,191

15 Claims. (Cl. 107—1)

My invention relates to the method of and apparatus for applying nuts to candy bars.

An object of the invention resides in providing a method and an apparatus whereby the application of the nuts may be rendered positive and maintained under control and whereby economy in time and material can be effected.

An object of the invention resides in providing a method of applying nuts to candy bars which consists in first coating the nuts with a suitable coating such as chocolate or the like and in thereafter applying the nuts to the candy bars.

Another object of the invention resides in coating the nuts before applying the same to the coated candy bars.

A still further object of the invention resides in coating the candy bars with the same coating and in applying the nuts thereto before either coating becomes finally set.

An object of the invention resides in providing an apparatus whereby the method may be expeditiously and effectively carried out.

Another object resides in providing an apparatus which can be used in conjunction with an ordinary enrobing machine.

A still further object of the invention resides in providing a conveyor for carrying the candy bars from the enrobing machine and in timing the operation of my nut applying apparatus to cause the application of the nuts to the candy bars as the same are progressed by the conveyor.

An object of the invention resides in providing a cylinder having pockets therein for the reception of the nuts and in providing means for rotating said cylinder at a speed proportional to the rate of travel of the conveyor.

Another object of the invention resides in providing a nut feeding device for feeding measured quantities of the nuts into said pockets.

A still further object of the invention resides in providing a chocolate feeding device for applying a coating of chocolate to the nuts while in the pockets.

A feature of the invention resides in constructing the nut feeding device and the pockets in the cylinder for the reception thereof adjustable to regulate the quantity of nuts applied to the candy bars.

An object of the invention resides in providing the nut feeding device with a nut hopper and a roller therein having pockets for measuring out and feeding to the pockets in the cylinder predetermined quantities of nuts.

A feature of the invention resides in providing a flexible member as for example a brush for leveling of the nuts within the pockets of the roller as the same are filled with nuts from the nut hopper.

An object of the invention resides in providing a reclaiming device for removing the surplus chocolate applied to the nuts.

Another object of the invention resides in constructing the nut applying device with a main frame along which the conveyor travels and in further constructing the same with an auxiliary frame adjustable relative thereto for varying the height between the cylinder and conveyor to accommodate different heights of candy bars.

An object of the invention resides in constructing the apparatus with a case in which the various parts are disposed and in providing within the case heating means for maintaining the coating material liquid.

Other objects of the invention reside in the novel combination of parts and in the details of construction hereinafter illustrated and/or described.

In the drawings:

Fig. 1 is an end elevational view of an apparatus illustrating an embodiment of my invention.

Fig. 2 is a longitudinal, sectional view taken on line 2—2 of Fig. 1.

Fig. 5 is a cross sectional view taken on line 5—5 of Fig. 2.

Fig. 6 is a longitudinal sectional view taken substantially on line 6—6 of Fig. 4.

Fig. 11 is an elevational detail view of the vibrating mechanism of the invention.

Figure 3:
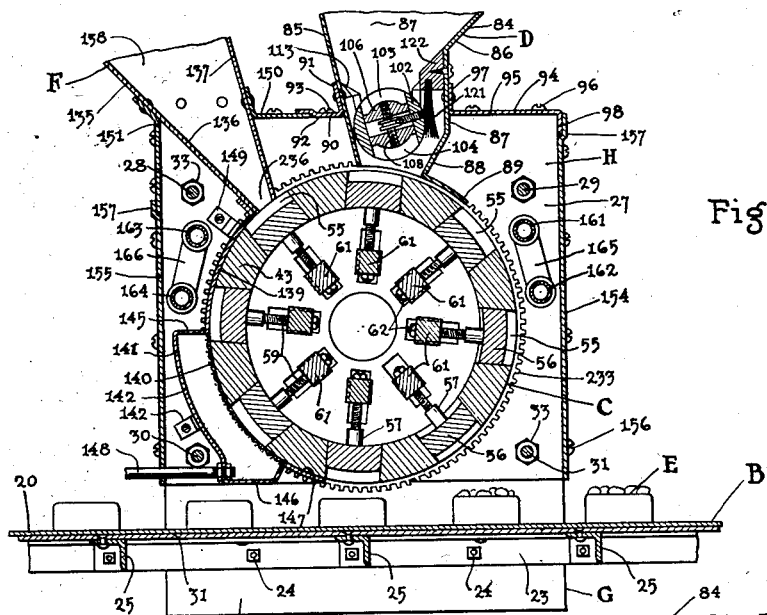
Fig. 3 is a cross sectional view taken on line 3—3 of Fig. 2.

In the application of nuts and other similar edibles to coated candy bars, considerable difficulty has been encountered in applying the nuts directly to the same. The present invention provides a machine and a method whereby plain or coated nuts and other similar edibles may be readily and automatically applied to the candy and caused to remain permanently thereon.

In the following description of my method and apparatus, for the sake of convenience, I only refer to the edible applied to the candy as nuts, though it can readily be comprehended that raisins or other forms of whole or cut up fruit or in fact any suitable edible may be applied. Likewise, I refer to the coating as chocolate coating, though it can also be comprehended that any sugary coating or other coating whatsoever may be used without departing from the spirit of the invention. Similarly, the method and apparatus may be used with cakes and other edibles as well as candy bars.

My invention proper consists of an apparatus or a machine which I have indicated in its entirety at A. This machine includes a belt or conveyor B which may be the delivery belt of the enrobing machine used for coating the candy bars or a separate belt receiving the bars from the enrobing machine after the same have been covered with the desired coating. Superimposing this belt is a cylinder C arranged to receive apportioned quantities of nuts from a nut feeding device D and to discharge the same upon the candy bars which I have designated at E during the travel of the conveyor B below the cylinder C. In conjunction with the other parts of the machine a chocolate feeding device is employed which is designated at F and which coats the nuts prior to their application to the candy bars. The frame of the invention consists of a main frame G which includes a part of the supporting structure for the conveyor B and which carries an auxiliary frame H in which the cylinder C is journaled. These parts will now be described in detail.

The main frame G of the machine consists of two end frame members 15 and 16 having spaced upstanding legs 17 and 18 and formed with base portions 19 adapted to rest upon a table or other supporting structure on which the machine is to be carried. This frame supports the conveyor B and also the auxiliary frame in which the cylinder C is journaled.

The conveyor B consists of a belt 20 which is preferably of a width equal to the entire width of the machine between the two end frame members 15 and 16 and on which candy bars E directly rest. This belt rides upon a metal plate 21 of the full width of the frame which metal plate is carried on longitudinal angle bars 22 and 23 secured to the end frame members 15 and 16 through bolts 24. Suitable transverse angles 25 arranged at suitable intervals support the plate 21 laterally thereof. As the belt 20 travels over the plate 21, the said belt is held in fixed elevation so that the nuts or other edibles may be placed upon the candy in its passage through the machine.

Figure 7:
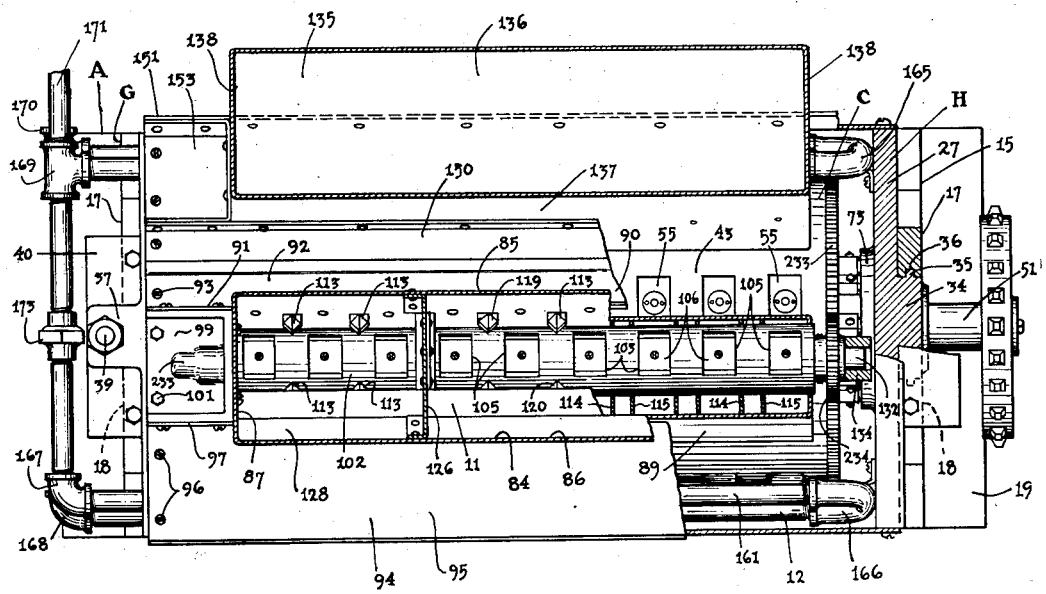
Fig. 7 is a plan view of the invention with parts broken away to show the interior construction thereof.

Associated with the main frame G is the auxilliary frame H previously referred to. This frame, similar to the frame G, consists of two end frame members 26 and 27 which are held in spaced relation through four stay bolts 28, 29, 30 and 31. These bolts have nuts 32 and 33 applied to the ends thereof whereby said bolts may be rigidly attached to the end frame members 26 and 27 to form a substantial and rigid frame structure. The end frame members 26 and 27 have guide blocks 34 which are constructed with tongues 35 (Fig. 7), adapted to slide in grooves 36 formed in the two uprights 17 and 18 of the end frame members 15 and 16 of the main frame G. By means of this construction the entire cylinder which is carried by the frame H and the associated structures are slidably supported for movement toward and from the conveyor B so that the device may be used in conjunction with candy bars of different height.

For supporting the frame G the two frame members 26 and 27 of frame H are provided with outwardly extending flanges 37 which are bored as indicated at 38 to receive adjusting screws 39. These screws are attached to bars 40 through pins 41, which bars are themselves secured to the upper ends of the legs 17 and 18 of frame members 15 and 16 through cap screws 42. Two nuts 43 and 44 one for each screw and disposed on opposite sides of the flange 37 are threaded on the screws 39 and serve to raise and lower the entire frame H with respect to the frame G upon rotation of said nuts and further serve to hold the parts in rigid position.

As previously stated, the frame H supports the cylinder C. This cylinder consists of a cylindrical shell 43 of substantial thickness which is carried by two circular flanges 44 and 45. The flanges 44 and 45 have shoulders 46 and 47 formed therein for the reception of the shell 43 and are attached thereto through cap screws 48. At the centers of these flanges are secured stub shafts 50 and 51 which are concentric with the shell 43 and which serve to rotatably support the cylinder proper. These stub shafts are threaded into the flanges 44 and 45 to form a rigid construction and are journaled in bearings 52 and 53 formed in the blocks 34 of frame members 26 and 27. The shaft 51 extends outwardly beyond the machine proper and has attached to it a sprocket wheel 54 or some other suitable power transmission device whereby the cylinder may be rotated in the operation of the machine.

In the cylinder C are arranged a number of radial pockets 55 situated in longitudinally extending rows circumferentially disposed about the cylinder. The distance apart of these pockets is equal to the transverse spacing of the candy bars on the belt 20 and the circumferential spacing of the rows of pockets is equal to the longitudinal spacing of the bars on said belt. Nuts are discharged from the nut feeding device D to these pockets, which nuts are subsequently coated with chocolate from the device F and thereafter discharged from said pockets and upon the candy bars at the proper moment the candy bars are passing beneath said pockets. This is all accomplished through a suitable discharge mechanism which will now be described in detail.

Figure 10:
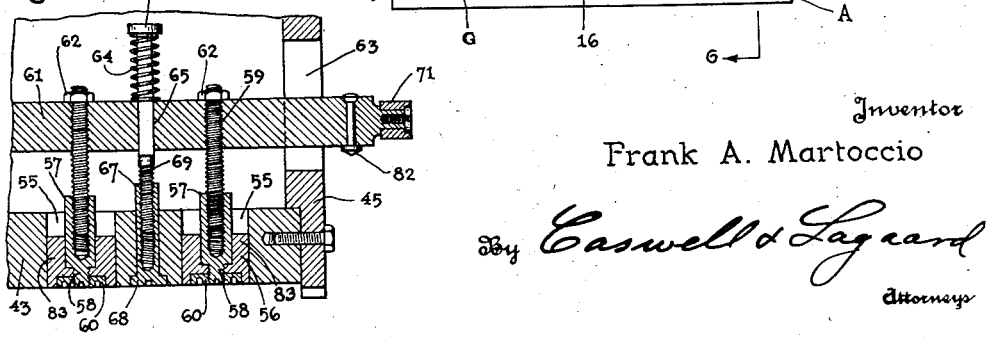
Fig. 10 is a fragmentary longitudinal sectional view of the ejecting mechanism of the invention.
Figure 8:
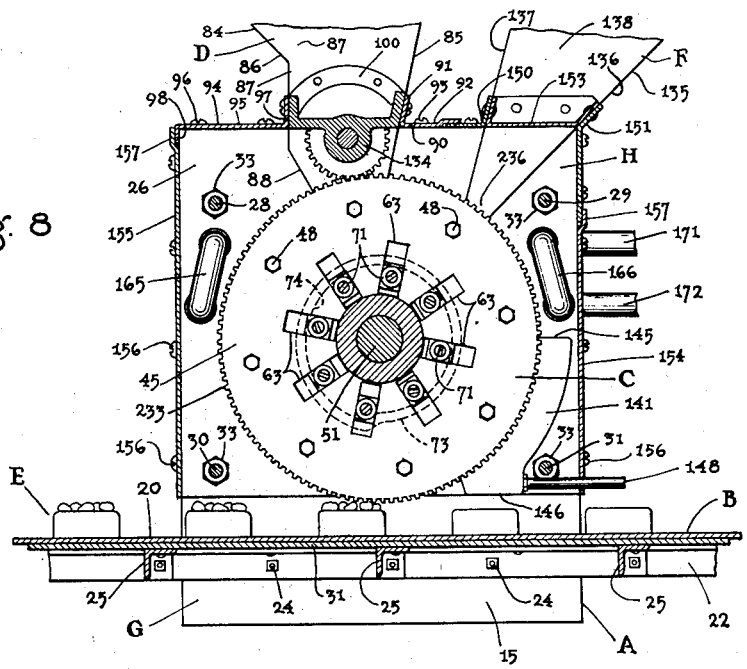
Fig. 8 is a cross sectional view taken on line 8—8 of Fig. 6.

In each of the pockets 55 is disposed a plunger which is operated in timed sequence with respect to the operation of the conveyor B. Inasmuch as all of these plungers are identical, only one will be described in detail, which is illustrated in Fig. 10. This plunger is indicated in its entirety at 56 and consists of a casting forming a head 63 adapted to substantially extend across said pocket and to slide radially with respect thereto. This plunger has attached to it a sleeve 57 which is internally threaded to receive an adjusting screw 58. The sleeve 57 is formed at its outer end with a reduced portion 59 which extends through an opening in said plunger and which is adapted to be held rigidly attached thereto through a lock nut 60. The end of the sleeve 57 and the nut 60 are so constructed that the same lie flush with the outer end of the head 63 so that a smooth surface is presented thereon said structure forming a movable bottom for the pocket 55, which, when the parts are arranged as shown in Fig. 10, is completely filled by said plunger.

The plungers 56 of each row are all connected to a common operating bar, said bars being circumferentially arranged and being indicated at 61. The adjusting screws 59 previously referred to and which are attached to the plungers 56, are threaded in the bars 61 and are held rigidly secured thereto through lock nuts 62. The ends of the bars 61 extend through radial slots 63 in the flanges 44 and 45 of cylinder C whereby the said bars are guided for reciprocating movement in a radial direction, each bar simultaneously operating the various plungers connected thereto.

The bars 61 are urged outwardly through a number of compression coil springs 64, there being two of such springs for each bar, said springs being applicable to the bars near the opposite ends thereof. Such springs being identical for all the bars, only one thereof will be described, which is shown in detail in Fig. 10. This spring encircles a bolt 65 which is slidably mounted in said bar and extends through the same in a radial direction, projecting inwardly of the bar. The spring 64 is seated at one end against the inner surface of said bar and at its other end against the head 66 of bolt 65 and when said bolt is held from movement, operates to force the bar in an outward direction urging the plungers 56 into ejecting position. For varying the spring tension a sleeve 67 is employed which extends through the shell 43 of cylinder C and is formed with a head 68 seated against said cylinder. This sleeve is internally threaded to screw upon the threaded end of bolt 65 and operates to move said bolt longitudinally when the sleeve is rotated. The shank of the bolt 65 where the same passes through the bar 61 is preferably formed square and the hole in the bar 61 for the reception thereof is likewise formed square so as to prevent rotation of the bolt when the sleeve 67 is rotated. The head 68 of this sleeve is similar to the lock nut 60 and is socketed in the shell 43 so as to lie flush with the outer surface of the cylinder proper.

Figures 4, 9:
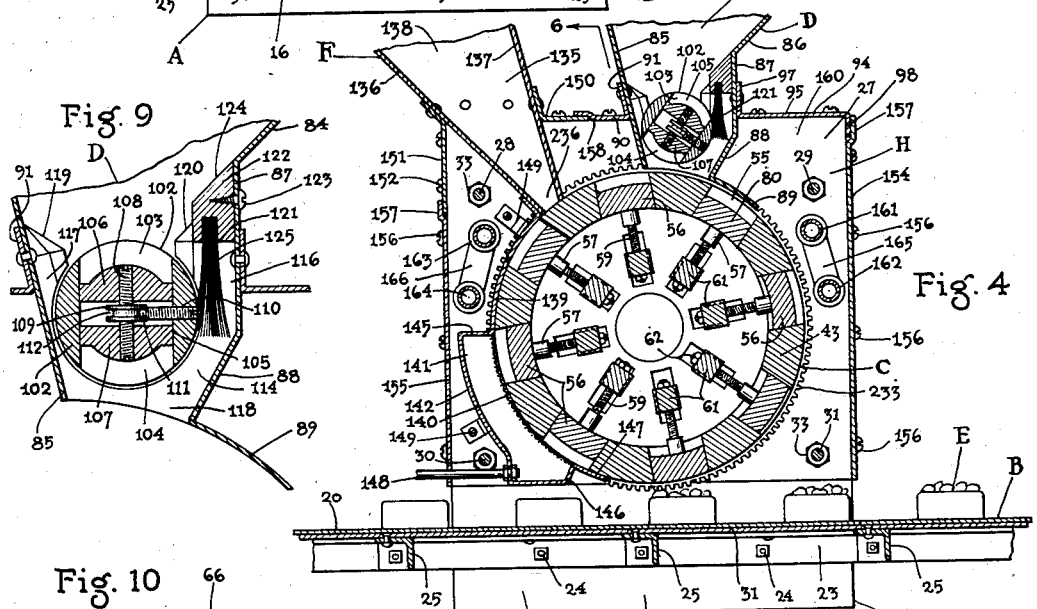
Fig. 4 is a cross sectional view similar to Fig. 3 showing the parts in relatively altered position.
Fig. 9 is a fragmentary cross sectional view taken through the adjusting mechanism for the nut feeding device.

As will be noted in Figs. 3 and 4, the plungers 56 are moved along the pockets thereof to open said pockets at the appropriate time to receive the nuts from the nut feeding device D and the chocolate from the device E and to discharge the coated nuts from the pockets as the said pockets pass over the candy bars traveling along on the belt 20. This is accomplished as follows: At the two ends of each of the bars 61 are mounted rollers 70 and 71 best shown in Fig. 5, which are adapted to engage corresponding internal cams 72 and 73 formed on the end frame members 26 and 27. These cams are identical in construction excepting that one is right handed and the other is left handed. Therefore, only cam 73 will be described in detail. Cam 73 is constructed with a circular track 74 whose center is concentric with the axis of the cylinder C extending from a locality indicated at 75 to a locality indicated at 76. Said cam is further formed with a portion indicated at 77 which extends abruptly outwardly from the circular portion 74 along a steep spiral terminating at a point indicated at 78. At this point, the cam spirals gradually inwardly along a portion 79 thereof until it meets the circular portion 74 at the locality 76. By means of this cam and through the springs 64 which urge the rollers 71 outwardly, the plungers 56 are caused to travel as follows: At the locality of the nut feeding device C the plungers are innermost and the pockets 55 are fully open to receive the nuts discharged into the same. The same remain open throughout the movement of said pockets past the chocolate coating device and to a position immediately above the candy bars on the belt 20. As the rollers 71 pass along the portion 77 of the cams the plungers are quickly forced outwardly causing the contents of the pockets 55 to be discharged upon the candy bars immediately underlying the same. The rollers are then gradually forced inwardly during the travel of the plungers from their lowermost position and to a position immediately in advance of the nut feeding device D, after which the said plungers are again carried through the same cycle of movements.

For the purpose of causing the coated nuts to readily leave the respective plungers, a vibrating device is employed which is best shown in Figs. 11 and 2. At the lowermost portions of each of the cams 72 and 73 is provided an inwardly extending ear 80 which is formed with upwardly directed serrations 81. This ear is located along the portion 79 of the cam immediately following the locality 78 thereof. These serrations are adapted to be engaged by a steel prong 82 secured to the ends of the bar 61. As the bars travel, the serrations 81 reciprocate the plungers rapidly into and out of the corresponding pockets which causes the coated nuts which might otherwise adhere to the plungers 56 to be freed therefrom and to be discharged upon the candy bars.

The nut feeding device D comprises a hopper which is indicated in its entirety at 84. This hopper consists of two sides 85 and 86 which flare outwardly and which are connected through ends 87 best shown in Figs. 3 and 6. The side 75 reaches down to the outer surface of the shell 43 of cylinder C while the other side 84 is formed with a vertical portion 87 and a radial portion 88, the latter reaching down to the surface of the shell 43 of said cylinder. The radial portion 88 is formed with a shoe 89 which overlies a portion of the surface of the cylinder C and the circumferential extent of which substantially equals the circumferential extent of the various pockets 55. This shoe prevents the nuts from spilling out of the pockets as the same are being filled in the same. The hopper 84 is supported on the frame structure H through an angle bar 90 which is formed with two legs 91 and 92. The leg 90 rests upon the two end frame members 26 and 27 of the frame H and is attached thereto through bolts 93. The other leg 91 of said angle bar is riveted to the side 85. Said hopper is further attached to the frame H through a Z-shaped member 94 which is formed with a web 95 resting upon the frame members 26 and 27 and secured thereto through bolts 96. This member is formed with a flange 97 which is riveted to the vertical portion 87 of the side 86 of said hopper and is further formed with another flange 98 which extends about the corners of the two frame members 26 and 27. Attached to the two members 99 and 94 are two castings 99 and 100 which fill up the space between said members and the hopper proper and which are attached to the upper portions of the frame members 26 and 27 through bolts 101.

Within the interior of the hopper 86 and at the lowermost portion thereof is provided a feed roller 102 which closes the lower end of said roller and which is shown in detail in Fig. 9. This roller is constructed substantially solid excepting for a number of openings 105 formed therein and is provided at its ends with stub shafts 131 and 132. These shafts 131 and 132 are journaled in bearings 133 and 134 formed on the undersides of the two castings 99 and 100 previously referred to. The roller 102 is driven from a gear 233 forward on the flange 45 of cylinder C, which gear meshes with a pinion 234 secured to the stub shaft 132. The casting 100 is constructed with a raised portion 135 which forms a housing for the reception of the pinion 234 so that the said pinion is completely enclosed within the machine proper.

The roller 102, as stated, is formed with openings 105 which extend completely across the same and which are disposed longitudinally with respect to the roller in conformity to the pockets on the cylinder C. In each of these openings are disposed two plungers 106 and 107 which are spaced from the outer periphery of the roller 102 to form oppositely disposed pockets 103 and 104. These pockets are of substantially the same circumferential and longitudinal dimensions as the pockets 55 in cylinder C and the depth thereof may be adjusted to conform to the depth of said last named pockets through an adjusting mechanism now to be described in detail. Between the two plungers 106 and 107 is disposed a spindle 108 formed at one end with left handed threads and at its other end with right handed threads. This spindle is screwed in the plungers 106 and 107 and operates upon rotation in one direction to move said plungers radially outwardly and upon rotation in the opposite direction to move said plungers inwardly. Intermediate the ends of this spindle is provided a grooved collar 109 which is adapted to receive a set screw 110 threaded into the wall structure of the roller 102. This set screw is formed with a reduced end 111 which fits into the groove 112 of collar 109 and which maintains the two plungers 106 and 107 centrally disposed with respect to the roller 102 and at the same time holds the spindle 108 from movement. When it is desired to vary the capacities of the pockets 103 and 104, the same may be accomplished by loosening the set screw 110 and by rotating spindle 108 in one direction or another.

The various pockets 103 disposed along the roller 102 are spaced from one another to correspond to the spacing of the pockets 55. This is best shown in Fig. 6. To cause the nuts to feed into these pockets a number of dividers are employed which are disposed between the same which are indicated at 113. Each of these dividers consist of two side walls 114 and 115 which are curved to fit about the periphery of the roller and which have portions 116 and 117 extending at the sides of the roller and portions 118 extending beneath the roller, all as clearly indicated in Fig. 9. The upper ends of these walls converge as illustrated at 119 and 120 so as to direct the nuts to either side thereof, these portions being wedged so as to offer a minimum obstruction to the movement of the nuts. These dividers separate the nuts entering the various pockets so that all of the nuts contained within the hopper 86 may be eventually delivered into the pockets, there being no places in the feeding device in which nuts may lodge.

To prevent nuts passing between the roller 102 and the side 85 of the hopper 86, said roller is positioned sufficiently close to said side. In the movement of the roller, the roller travels upwardly with respect to this side of the hopper and any nuts lying between said roller and side would be raised and loosened so that it would be impossible to have the nuts broken or injured at such locality. On the other side of the roller, a different situation arises and to prevent injury to the nuts, I employ a brush 121 which forms a yieldable wall extending up to the opposite side of the roller 102. This brush includes a brush block 122 which is attached to the vertical portion 87 of the side 86 of hopper 84 through screws 123. This block is coextensive with the length of the hopper 84 and is formed with an upper beveled surface 124 continuous with the inclined surface of the side 86 of said hopper. Issuing outwardly from the lower portion of the brush block 122 are bristles 125 which contact with the surface of the roller 102 and which are adapted to yield to irregularities caused by the nuts disposed in the pockets 103 and 104 projecting outwardly beyond the surface of said roller. The bristles 125 completely fill the entire space between the various dividers 113, being absent at the locality of said dividers and between the pockets 103.

The machine if desired may be used to simultaneously apply different kinds of nuts or different substances. For this purpose a number of partitions 126 and 127 are employed which are attached to certain of the dividers 113 and which extend from the two sides 85 to 86 of the hopper 84 and divide the same into several compartments 128, 129 and 130. The different nuts or other substances employed, may be placed in these various compartments and maintained segregated throughout the operation of the machine.

The roller 102 is timed with respect to the cylinder C so that the nuts received within the pockets 103 and 104 are discharged into the various pockets 55 of said cylinder as said pockets travel beneath the nut feeding device. This is accomplished by the selection of the proper ratio between two gears 134 and 133.

As the pockets are filled the same travel beneath the chocolate feeding device F which is best shown in Figs. 3 and 4. This device consists principally of a hopper 135 formed with a discharge nozzle 136 adapted to feed the chocolate upon the periphery of the cylinder C. This hopper and nozzle are preferably constructed as one structure having two sides 136 and 137 which converge to form a constriction constituting the nozzle 136. Two ends 138 at the extremities of the sides 136 and 137 enclose the hopper.

The hopper 138 of nozzle 136 is of slightly less width than the cylinder C. This hopper is supported upon the frame H in much the same manner as the nut feeding device 84. For this purpose two angles 150 and 151 are employed which are secured to said hopper and which are adapted to be attached to the sides 136 and 137 thereof and to the top and edges of the two end frames 26 and 27 through bolts 152. Suitable castings 153 are also employed which fill in the space between these angles so as to effect complete closure for the upper part of the machine.

For the purpose of reclaiming and removing the surplus chocolate from the nuts, a device is employed which will now be described in detail. This devices includes a shoe 139 which is disposed adjacent the nozzle 136 and follows about the periphery of the cylinder C for an appreciable distance. This shoe has attached to the lower end thereof an arcuate wire screen 140 which extends to within a short distance of the lowermost part of the cylinder. A case 141 encloses this screen and is constructed with a circumferential wall 142 and with two radially extending walls 145 and 146 extending up to the periphery of the drum. This case terminates in a shoe 147 similar to the shoe 139 and prevents the coated nuts from leaving the various pockets 55 until the discharge thereof is desired. A drain 148 in the case 141 serves to conduct away the surplus chocolate which is collected in said case through the screen 140. The entire reclaiming device including the shoe 139 and the case 141 is mounted on the two end plates 26 and 27 of frame H through brackets 149 which are bolted to said end plates and secured to the shoe 139 and the case 141. By means of this construction the nuts are completely coated with chocolate through the chocolate feeding device 135 and the surplus chocolate removed therefrom through screen 140 and discharged into case 141 where the same may be led away from the device through the drain 148. The nuts on leaving the device are hence completely covered with a suitable coating of chocolate so that waste of chocolate is greatly reduced.

The hot chocolate or other coating may be discharged into the hopper through a pump or the same may be filled into said hopper manually. Where a pump is used the hopper may, if desired, be dispensed with and the chocolate discharged directly into a suitable nozzle provided for the purpose.

For the purpose of enclosing the entire machine the structure used in conjunction with the two feeding devices 84 and 135 are employed which completely cover the top of the machine. In addition to this construction, two plates 154 and 155 are utilized which are attached to the vertical edges of the two end frames 26 and 27. These plates are secured to said frame members through bolts 156 and are formed with lap joints 157 adapted to overlie the branch 98 of member 94 and the corresponding portion of the angle 151. In addition the lowermost portions of the frame members 26, 27, 15 and 16 overlap so that the ends of the machine are completely closed for all positions of the frame H relative to the frame G. By means of this construction the entire device is enclosed particularly at the upper portions thereof so that the heat of the chocolate may be retained in order to prevent solidification of the same in the operation of the machine.

To assist in maintaining the chocolate at the proper temperature, heating means may be employed within the compartment 160 formed within the closure previously described. Such heating means consists of four pipes 161, 162, 163 and 164 connected together within the compartment 160 through suitable pipe bends 165 and 166. These various pipes extend through the end frame member 26 and the two pipes 161 and 162 have attached to them elbows 167 and 168, while the two pipes 163 and 164 have attached to them ties 169 and 170. These various fittings are connected in two pipes 171 and 172 which may be connected with a source of steam so that suitable heating fluid may be conducted to the said pipes to heat the space within the machine proper.

In the carrying out of my improved method for applying coated nuts to candy bars, the candy bars are first passed through an enrobing machine and the same coated with chocolate in the customary manner. As the pockets 55 in the cylinder C pass the nut feeding device D the nuts are fed therefrom and into said pockets. When the pockets pass the chocolate feeding device F the nuts are completely covered with chocolate. In the further travel of the pockets, the surplus chocolate is removed and upon reaching the lowermost portion of cylinder C, the nuts are discharged therefrom through the action of the plunger 56, as previously explained. The cylinder C is timed with the belt 20 so that the pockets 55 are immediately above the candy bars as the same pass beneath the machine. As the plungers are vibrated through the mechanism provided, the nuts are completely removed therefrom and deposited upon the candy bars in the desired manner.

As previously brought out, the machine may be used for applying any suitable form of solid substance to a coated object. The device may be used on cakes or other confections. Likewise fruits or pieces thereof or other edibles may be used in the place of nuts and any form of coating material may be employed.

My invention is highly advantageous in that an extremely effective and simple device is procured for performing the various functions desired. With my invention coated nuts can be positively applied to the candy bars and without the use of a great amount of manual labor. The machine is continuous in operation and is economical in the consumption of chocolate or other coating material. The machine may be used with different kinds of nuts at the same time and the quantity of nuts may be regulated through the adjusting device of the plungers operating in the pockets of the feed and delivery mechanisms. The machine is readily accessible and the parts may be easily inspected and repaired as occasion demands.

I claim:

1. The method of applying nuts to candy bars which consists in coating the candy bars, in separately coating the nuts, and in applying the coated nuts to the candy bars before the coating of the candy bars has become set.

2. The method of applying nuts to candy bars which consists in arranging the nuts in predetermined formation, in applying the coating to the arranged nuts and in transferring the coated nuts substantially in arranged formation to the candy bars and causing the formed nuts to adhere to the candy bars in such position.

3. An apparatus for applying nuts to candy bars comprising a support for the candy bars, means for guiding said support for movement at a fixed elevation, a frame, a nut feeding device carried by said frame and adapted to discharge the nuts upon the candy bars, guide means for supporting said frame for movement relative to said support to vary the elevation of the locality of the discharge of nuts therefrom and upon candy bars carried upon said support and means for holding said frame in adjusted position with respect to said support.

4. An apparatus for applying nuts to candy bars comprising a cylinder having pockets therein, means for filling said pockets with nuts, plungers in said pockets for ejecting the nuts therefrom, a common operating member for moving a plurality of said plungers and individual adjustable connecting members between said operating member and each of said plungers for procuring individual adjustment of each of the plungers with respect to its pocket.

5. An apparatus for applying nuts to candy bars comprising a cylinder having pockets therein, means for filling said pockets with nuts, plungers in said pockets for ejecting the nuts therefrom, means for causing the outward movement of said plungers to effect the ejection of the nuts from said pockets, and means for vibrating said plungers to free the nuts therefrom.

6. An apparatus for applying nuts to candy bars comprising a frame, a cylinder journaled in said frame and having pockets therein for the reception of nuts, a hopper attaching means for removably attaching said hopper to said frame in a position to discharge nuts into said pockets, a roller in said hopper for feeding the nuts therefrom and into the pockets of said cylinder, means for supporting said roller from said hopper said roller being removable with said hopper and serving to form a bottom for the hopper to retain the nuts therein upon removal of the hopper from said frame.

7. An apparatus for applying nuts to candy bars comprising a frame, a cylinder journaled therein and having pockets for the reception of nuts, a feeding device for feeding a liquid coating to the nuts in said pockets and a perforate member following about the periphery of the cylinder for draining off surplus liquid coating from the nuts as the pockets of the cylinder are moved past the same.

8. An apparatus for applying nuts to candy bars comprising a frame, a cylinder journaled therein and having pockets for the reception of nuts, a feeding device for feeding a liquid coating to the nuts in said pockets, a perforate member following about the periphery of the cylinder for draining off surplus liquid coating from the nuts as the pockets of the cylinder are moved past the same and a receptacle connected with said perforate member for receiving the liquid passing through the same.

9. The method of applying nuts to candy bars, which consists in coating the candy bars at one locality, coating the nuts at another locality, transferring the coated bars to the locality of coating of the nuts and in directly transferring the coated nuts to the coated candy.

10. An apparatus for applying nuts to candy bars comprising a member having pockets for the reception of nuts, means for feeding nuts into said pockets, means for applying a coating to the nuts while in said pockets, means for discharging the nuts from said pockets and means for bringing candy bars up to said nut discharge means and for removing the bars therefrom, said discharge means functioning to deposit the coated nuts upon the candy bars during the discharge thereof.

11. An apparatus for applying nuts to candy bars comprising a fixed member, a frame member vertically movable relative to said fixed member, uprights connected to one of said members and detachable from the other of said members, means for securing said uprights to the other member, a support for candy bars movable along said fixed member at a predetermined elevation, and a nut feeding device carried by said frame for discharging nuts upon the candy bars, the adjustment of said frame through said uprights serving to vary the elevation of the locality of the discharge of the nuts from the nut feeding device.

12. A nut feeding device comprising a hopper, a roller within said hopper having pockets therein, said roller being disposed in close proximity to some of the walls of said hopper to prevent the escape of said nuts from said hopper therebetween, and spaced from another of the walls of said hopper, and a stationary brush extending along said roller and disposed between the roller and the spaced wall of the hopper, said brush being formed with an elongated body having bristles projecting from an edge thereof, said bristles tangentially engaging the periphery of said roller.

13. An apparatus for applying nuts to candy bars comprising a cylinder having pockets therein, means for filling said pockets with nuts, plungers in said pockets for ejecting the nuts therefrom, said pockets being arranged in longitudinally extending rows, a bar within said cylinder extending along each row of pockets, screws between said bars and the corresponding plungers for adjusting the capacity of said pockets and means for bodily moving said bars in a radial direction.

14. An apparatus for applying nuts to candy bars comprising a frame, a cylinder journaled in said frame and having pockets therein for the reception of nuts, plungers in said pockets for ejecting the nuts therefrom, means for causing said plungers to move outwardly when the pockets approach the underside of the cylinder, and means for vibrating said plungers when the plungers are in ejecting position.

15. An apparatus for applying nuts to candy bars comprising a frame, a cylinder journaled in said frame and having pockets therein for the reception of nuts, plungers in said pockets for ejecting the nuts therefrom, cams on said frame for causing said plungers to move outwardly when the pockets are on the underside of the cylinder and projections on said cams for causing a vibratory movement of said plungers when the plungers are in ejecting position.

FRANK A. MARTOCCIO.